(12) United States Patent
Ikenaka

(10) Patent No.: US 7,050,236 B2
(45) Date of Patent: May 23, 2006

(54) DIFFRACTIVE OPTICAL ELEMENT AND OPTICAL PICKUP APPARATUS

(75) Inventor: Kiyono Ikenaka, Hino (JP)

(73) Assignee: Konica Minolta Opto, Inc., Tokyo (JP)

(*) Notice: Subject to any disclaimer, the term of this patent is extended or adjusted under 35 U.S.C. 154(b) by 0 days.

(21) Appl. No.: 11/042,529

(22) Filed: Jan. 24, 2005

(65) Prior Publication Data
US 2005/0168821 A1 Aug. 4, 2005

(30) Foreign Application Priority Data
Jan. 30, 2004 (JP) .............................. 2004-023773

(51) Int. Cl.
G02B 27/44 (2006.01)

(52) U.S. Cl. ...................... 359/569; 359/570; 359/708; 369/112.08

(58) Field of Classification Search ................ 359/569, 359/570, 708
See application file for complete search history.

(56) References Cited

U.S. PATENT DOCUMENTS 5,969,862 A * 10/1999 Maruyama ................... 359/565
6,411,442 B1 * 6/2002 Ota et al. ..................... 359/642
2004/0036972 A1 * 2/2004 Kimura et al. ............... 359/570

FOREIGN PATENT DOCUMENTS

JP 2002-298422 10/2002

* cited by examiner

Primary Examiner—Fayez G. Assaf
(74) Attorney, Agent, or Firm—Cohen, Pontani, Lieberman & Pavane

(57) ABSTRACT

The present invention relates to a diffractive optical element which has chromatic aberration capable of recording and reproducing without any problem even in the case of instantaneous wavelength change in a laser beam that cannot be followed by an actuator, and can control an adverse effect caused on a spot diameter of a converged spot and on a signal read by a sensor. The diffractive optical element includes a diffractive structure, and diffraction efficiency of $m^{th}$ order diffracted beam satisfies prescribed conditions, and a distance between a paraxial converging position of the diffracted beam having a higher diffraction efficiency among $(m+1)^{th}$ order diffracted beam and $(m-1)^{th}$ order diffracted beam and a paraxial converging position of the $m^{th}$ diffracted beam satisfies prescribed conditions, when m represents a diffraction order number of the diffracted beam used for the first optical information recording medium.

40 Claims, 5 Drawing Sheets

DIFFRACTIVE OPTICAL ELEMENT AND OPTICAL PICKUP APPARATUS

FIELD OF THE INVENTION

The present invention relates to a diffractive optical element and to an optical pickup apparatus equipped with the diffractive optical element.

With respect to an optical pickup apparatus used for recording and reproducing of information for various optical disks such as the so-called high density disc wherein recording density has been raised and storage capacity has been increased by using optical disks such as DVD (digital versatile disc) and CD (compact disc) and a blue laser beam having a wavelength of about 400 nm, there is known recently a technology to provide a diffractive structure on an optical surface of an optical element composing an optical system for the purpose of securing an amount of light and of correcting aberration for a light flux used for optical disks (for example, see Patent Document 1).

The technology disclosed in Patent Document 1 is one wherein there is compatibility for three types of optical disks including a high density optical disc, DVD and CD and there is provided a diffractive structure on an optical surface of an optical element composing an optical pickup apparatus for securing an amount of light of a light flux used for each optical disk and for correcting-spherical aberration caused by wavelength difference or by protective substrate thickness difference.

(Patent Document 1) TOKKAI No. 2002-298422

In general, when a light flux passes through a diffractive structure, there are generated diffracted beams in plural diffraction order numbers, and among them, the diffracted beam having the highest diffraction efficiency is used in recording and reproducing for optical disks. However, there is a problem that diffracted beams which have low diffraction efficiency and have been left unused (hereinafter referred to as "useless diffracted beams") exerts a bad influence upon operations of an optical pickup apparatus.

Specifically, when a position where the useless diffracted beams intersect the optical axis after passing through an objective lens and a position where the diffracted beam used intersects the optical axis after passing through the objective lens overlap each other, there is a problem that a diameter of a spot representing a converged spot on an information recording surface of an optical disk is enlarged, and an apparent numerical aperture NA is lowered. In particular, when a position of a paraxial convergence of the useless diffracted beams and a position of a paraxial convergence of the diffracted beam used overlap each other, phases of both diffracted beam agree each other at the converged spot, which makes the problem of enlargement of the spot diameter to be more remarkable.

Further, when a position where the useless diffracted beams intersect the optical axis after passing through an objective lens is close to a position where the diffracted beam used intersects the optical axis after passing through the objective lens, the useless diffracted beams that are reflected on an information recording surface of an optical disk sometimes enter a sensor for detection of reflected light, and thereby, a noise is mixed in RF signals and an error for reading recording and reproducing signals is caused. RF signals are signals used for focus detection in an astigmatism method, and they show characteristics of returning from a sensor for a difference ($\Delta fB$) from the best focus position. Focus detection is carried out by utilizing linearity of the RF signals.

Since a distance between positions of a paraxial convergence in the direction of an optical axis for the diffracted beams depends on the power of the diffraction, it exerts an influence on chromatic aberration of a laser light flux to be used.

Further, in the technology disclosed in Patent Document 1, a paraxial converging position of the useless diffracted beams are too far from a paraxial converging position of the diffracted beam to be used, which causes a fear that aberration of converged spot in the case of wavelength changes such as mode hop may be adversely affected.

Problems stated above are taken into consideration in the invention, and an object of the invention is to provide a diffractive optical element which has chromatic aberration capable of recording and reproducing without any problem even in the case of instantaneous wavelength change in a laser beam that cannot be followed by an actuator, and can control an adverse effect caused on a spot diameter of a converged spot and on a signal read by a sensor, and to provide an optical pickup apparatus equipped with the diffractive optical element.

For solving the problems stated above, the diffractive optical element of the invention comprises a diffractive structure, and diffraction efficiency of $m^{th}$ order diffracted beam satisfies prescribed conditions, and a distance between a paraxial converging position of the diffracted beam having a higher diffraction efficiency among $(m+1)^{th}$ order diffracted beam and $(m-1)^{th}$ order diffracted beam and a paraxial converging position of the $m^{th}$ diffracted beam satisfies prescribed conditions, when m represents a diffraction order number of the diffracted beam used for the first optical information recording medium.

DETAILED DESCRIPTION OF THE INVENTION

Figure 1:
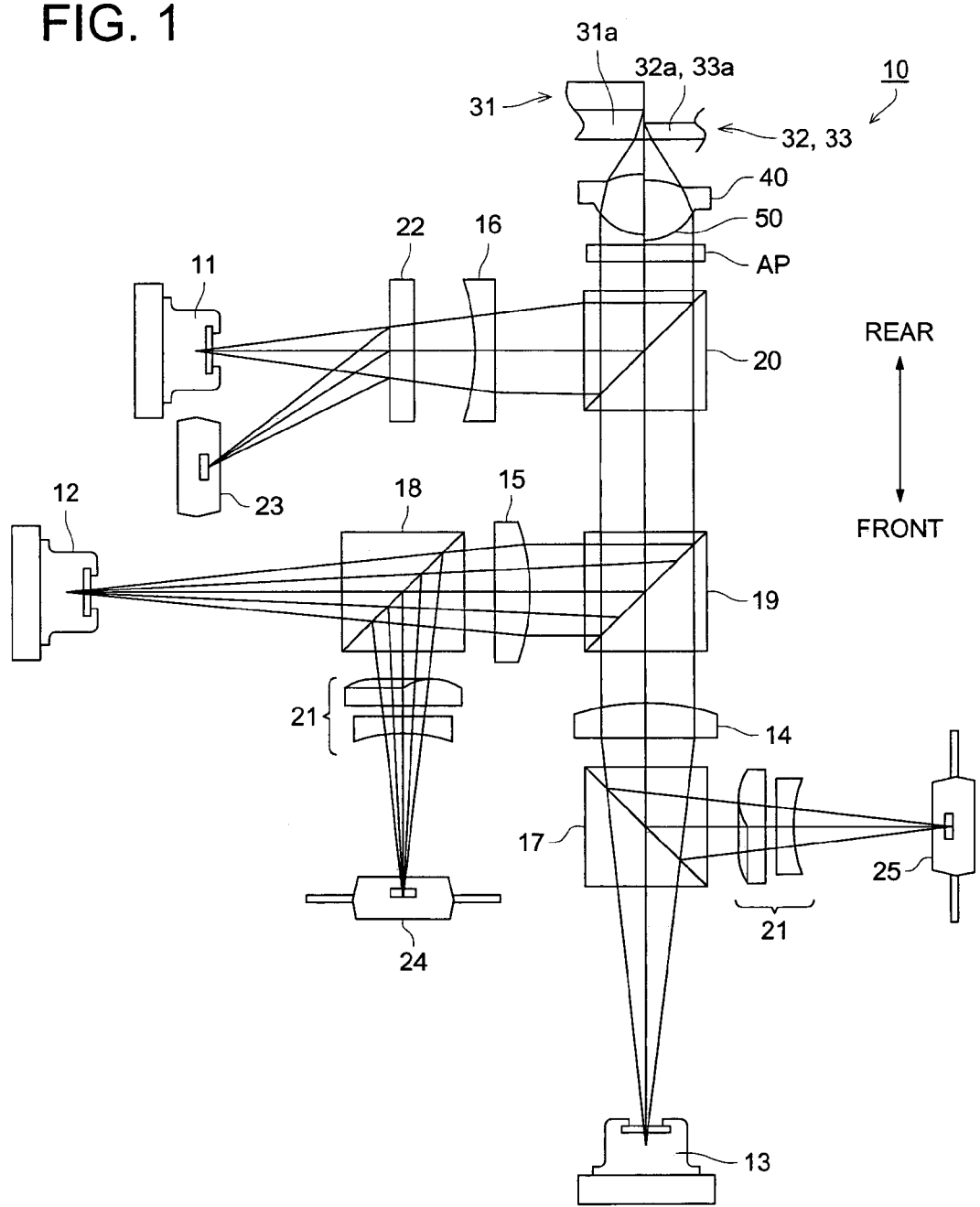
FIG. 1 is a plan view showing the structure of an optical pickup apparatus.

Preferred embodiments of the invention will be explained as follows.

To solve the aforementioned problems, the structure described in Item 1 is a diffractive optical element used for an optical pickup apparatus for reproducing and/or recording information for the first optical information recording medium by converging a light flux with wavelength $\lambda 1$ on an information recording surface of the first optical information recording medium having a protective substrate with thickness t using an objective lens in a converging optical system, wherein a diffractive structure is formed on an area that is at least one optical surface of the diffractive optical element and includes an optical axis, diffraction efficiency E of $m^{th}$ order diffracted beam satisfies the following expression (1), and distance L [mm] between a paraxial converging position of the diffracted beam having a higher diffraction efficiency-among $(m+1)^{th}$ order diffracted beam and $(m-1)^{th}$ order diffracted beam and a paraxial converging position of the $m^{th}$ diffracted beam satisfies the following expression (2), when m represents a diffraction order number of the diffracted beam used for reproducing and/or recording information for the first optical information recording medium among diffracted beams with plural diffraction orders generated when the light flux with wavelength λ1 receives diffractive actions from the diffractive structure.

$$20\% \leq E \leq 90\% \tag{1}$$

$$0.0016 \leq L/f \leq 0.032 \tag{2}$$

In the foregoing, m represents a positive integer, f [mm] represents a focal length for the light flux with the wavelength λ1 of the diffractive optical element for the $m^{th}$ order diffracted beam, and $(m-1)^{th}$ diffracted beam in the case of m–1, namely, $0^{th}$ order diffracted beam means a light flux that is not given a substantial optical path difference by the diffractive structure and passes as it is through the diffractive structure without being diffracted.

The word "converged spot" mentioned in the present specification means a spot formed by the focusing position where wavefront aberration of light converged by an objective lens is smallest.

The word objective lens mentioned in the present specification means an optical element having the light-converging function arranged to face an optical information recording medium at the position that is closest to the optical information recording medium under the condition that the optical information recording medium is mounted on the optical pickup apparatus.

The objective lens is not limited to one composed of only one single lens, and it may also be one wherein lens groups each being composed of plural lenses coupled in the optical axis direction are combined together.

The word "paraxial converging position" mentioned in the present specification means a position where the light flux that has passed through an area inside the third ring-shaped zone where the minimum diffractions are generated is converged, when a diaphragm is provided so that light may not enter an area outside the fourth ring-shaped zone from the optical axis center of a diffractive structure.

Further, the optical information recording medium is an ordinary optical disk conducting recording and/or reproducing of information by using a light flux having prescribed wavelength such as CD, DVD, CD-R, MD, MO and high density optical disc.

Further, the high density optical disc is one wherein optical disks employing a violet semiconductor laser and a violet SHG laser as a light source for recording and reproducing of information are named generically, and it includes also an optical disk on which recording and reproducing of information are conducted by an objective optical system with NA 0.65, and a thickness of a protective layer is about 0.6 mm (AOD: Advanced Optical Disc) in addition to an optical disk that conducts recording and reproducing of information with an objective optical system with NA 0.85 and complies with a standard of a thickness of a protective layer which is about 0.1 mm. In addition to the optical disk having, on its information recording surface, the protective layer, an optical disk having, on its information recording surface, a protective film with a thickness of several nm—several tens nm and an optical disk having, on its information recording surface, a protective layer or a protective film with a thickness of zero are also assumed to be included. In the present specification, a magneto-optical disk employing a violet semiconductor laser or a violet SHG laser as a light source for recording and reproducing of information is also assumed to be included in the high density optical disc.

In the present specification, the word DVD is a general term of optical disks in DVD series such as DVD-ROM, DVD-Video, DVD-Audio, DVD-RAM, DVD-R, DVD-RW, DVD+R and DVD+RW and the word CD is a general term of optical disks in CD series such as CD-ROM, CD-Audio, CD-Video, CD-R and CD-RW.

In the structure described in Item 1, by making L/f to be 0.0016 or more, it is possible to make a paraxial converging position of the diffracted beam having higher diffraction efficiency among $(m+1)^{th}$ diffracted beam and $(m-1)^{th}$ diffracted beam, namely of the diffracted beam having higher diffraction efficiency among useless diffracted beams and a paraxial converging position of $m^{th}$ diffracted beam to be used to disagree with each other in terms of position on the optical axis and to be away from each other, and it is possible to prevent enlargement of a spot diameter of a converged spot even when a diffraction efficiency of $m^{th}$ diffracted beam a diffraction efficiency of the diffracted beam having higher diffraction efficiency among useless diffracted beams are substantially the same after they are compared.

Further, by making L/f to be 0.032 or less, it is possible to control a change amount of position along an optical axis on which a wavefront aberration is minimum corresponding to a wavelength variation with 1 nm in a converged spot formed on the information recording surface of the first optical information medium using the m-th order diffracted beam, ΔfB (chromatic aberration) to a small value, and it is possible to prevent that focusing characteristics of the objective lens in mode hopping are adversely affected.

The structure described in Item 2 is the diffractive optical element according to Item 1, wherein 0.003≦L/f≦0.032 is satisfied.

Further, by making E to be 20% or more, an amount of light of $m^{th}$ diffracted beam can be secured, and reproducing and/or recording of information for the first optical information recording medium can be conducted satisfactorily. Further, by making E to be 90% or less, the structure relating to the invention can be utilized effectively, because an amount of light of the $(m+1)^{th}$ diffracted beam and that of the $(m-1)^{th}$ diffracted beam can be secured.

The structure described in Item 3 is the diffractive optical element according to Item 1 or Item 2, wherein a position where the diffracted beam having the higher diffraction efficiency intersects the optical axis is different from a position where the $m^{th}$ diffracted beam intersects the optical axis.

Figure 6:
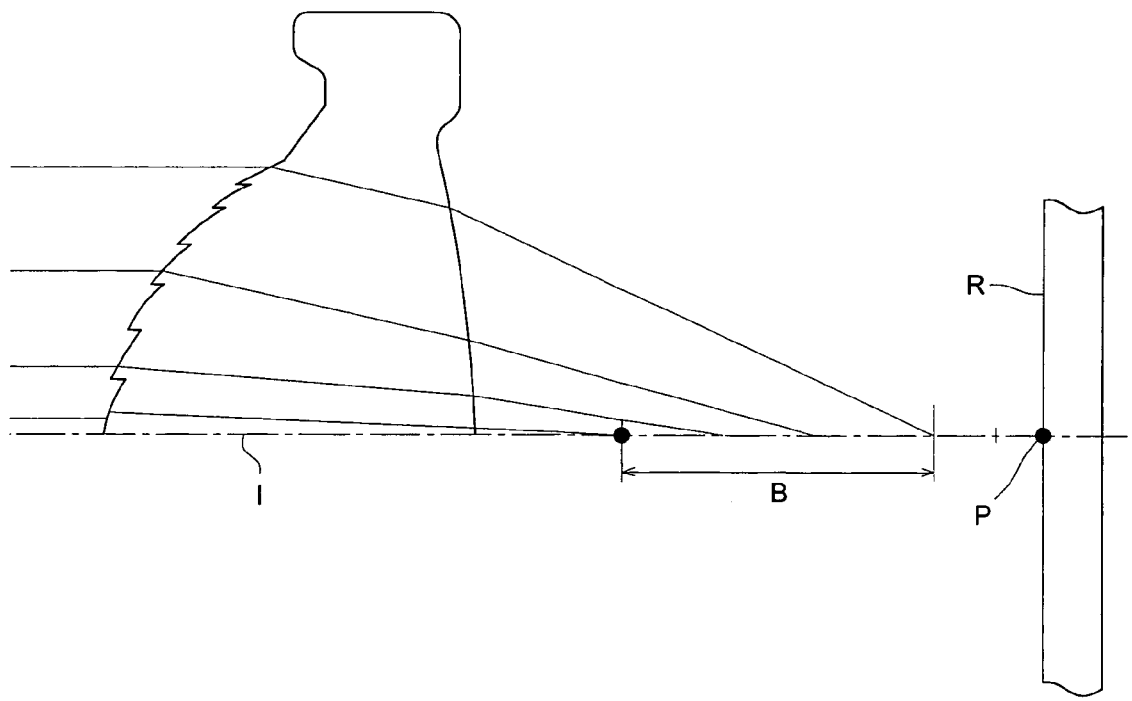
FIG. 6 is a diagram for illustrating "a position where diffracted beams intersect an optical axis".

In the present specification, "a position where the diffracted beam intersects the optical axis" or "an intersection of the m-th order diffracted beam and the optical axis" means range B formed by a subset of points where the diffracted beams having the prescribed order numbers that have been subjected to diffracting actions by the diffractive structure formed on the optical surface of the objective lens intersect the optical axis 1 after passing through the objective lens, when the diffractive optical element is an objective lens, as shown in FIG. 6.

The structure is designed so that $m^{th}$ diffracted beam used for reproducing and/or recording of information for the first optical information recording medium may be converged on one point on optical axis 1 and on information recording surface R of the first optical information recording medium, and may form converged spot P, while, a diffracted beam having another order number (for example, $(m+1)^{th}$ order diffracted beam) which is not used for the first optical information recording medium may not be converged at one point on optical axis 1, as shown in FIG. 6.

By designing so that a position (B in FIG. 6) where a diffracted beam having higher diffraction efficiency among useless diffracted beams intersect an optical axis after passing through an objective lens may disagree with a position (converged spot P shown in FIG. 6) where $m^{th}$ order diffracted beam intersects an optical axis after passing through the objective lens, as in the structure described in Item 3, it is possible to prevent enlargement of a spot diameter of the converged spot and to prevent that useless diffracted beams reflected on information recording surface R enter a detector (a sensor) for reflected light of a light flux with wavelength $\lambda 1$, thus, it is possible to keep the linearity of RF signals for an amount of defocus and to prevent that focusing characteristics of the objective lens are adversely affected.

Figure 7:
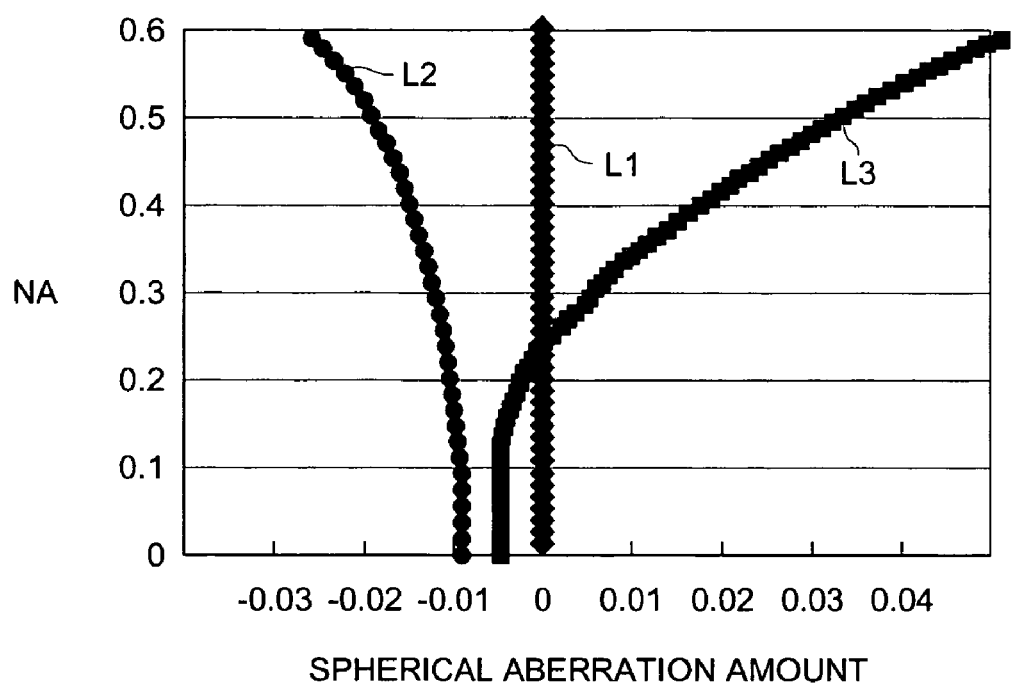
FIG. 7 is a longitudinal spherical aberration diagram for illustrating "a position where diffracted beams intersect an optical axis".

FIG. 7 is one showing the state of FIG. 6 in a longitudinal spherical aberration diagram.

Line L1 shows longitudinal spherical aberration of the $m^{th}$ order diffracted beam, and line L2 shows longitudinal spherical aberration of the $(m+1)^{th}$ diffracted beam. As stated above, the wording of "a position where the diffracted beam having higher diffraction efficiency intersects an optical axis disagrees with a position where $m^{th}$ order diffracted beam intersects an optical axis" or "an intersection of the diffracted beam with the higher diffraction efficiency and an optical axis is different from an intersection of the m-th order diffracted beam and the optical axis" can also be expressed in another wording of "two lines L1 and L2 showing respectively longitudinal spherical aberrations of both diffracted beams do not intersect each other". For example, when intersecting partially the line L1 as in line L3, enlargement of a spot diameter of the converged spot is caused. Incidentally, line L2 may also be longitudinal spherical aberration of the $(m-1)^{th}$ order diffracted beam.

The structure described in Item 4 is the diffractive optical element according to Item 3, wherein the position where the diffracted beam having the higher diffraction efficiency intersects the optical axis is closer to the objective lens than the position where the $m^{th}$ diffracted beam intersects the optical axis is.

In the structure described in Item 4, it is possible to adjust the best focus position without any problem that the diffracted beam having higher diffraction efficiency enters the sensor, because an objective lens approaches an optical information recording medium usually from the farther position in the course of focus detection.

The structure described in Item 5 is the diffractive optical element according to any one of Items 1–4, wherein the diffracted beam having higher diffraction efficiency is in the $(m-1)^{th}$ order in terms of the order number of diffraction.

The structure described in Item 6 is the diffractive optical element according to Item 5, wherein a paraxial converging position of the $(m-1)^{th}$ diffracted beam is closer to the image point than a paraxial converging position of the $m^{th}$ diffracted beam is.

The structure described in Item 7 is the diffractive optical element according to any one of Items 1–6, wherein m=2 holds.

The structure described in Item 8 is the diffractive optical element according to any one of Items 1–7, wherein 1 mm$\leq$f$\leq$4 mm is satisfied.

Incidentally, it is preferable that order number m is any one of 1, 2 and 3, and m=2 is more preferable.

The structure described in Item 9 is the diffractive optical element according to any one of Items 1–8, wherein $\Delta fB$ is a change amount of position along an optical axis on which a wavefront aberration is minimum corresponding to a wavelength variation with 1 nm in a converged spot formed on the information recording surface of the first optical information medium using the m-th order diffracted beam and satisfies $|\Delta fB|\leq 0.0001$ mm.

In the structure described in Item 9, it is possible to minimize an amount of defocus for a converged spot on an information recording surface in the case of occurrence of mode hopping.

For example, when a wavelength is changed in a short period of time from $\lambda$ to $\lambda'$ as in the case of mode hop of a light source, optical signals are controlled at a defocus position before the wavelength change, because tracking cannot be followed. Therefore, when a change of defocusing position for the objective lens is great in a period of wavelength change approximately, namely, when a value of the $|\Delta fB|$ is 0.0001 mm or more, deterioration of the wavefront aberration becomes remarkable, resulting in a fear of occurrence of troubles in control of optical signals.

The structure described in Item 10 is the diffractive optical element according to any one of Items 1–9, wherein the optical pickup apparatus further converges a light flux with wavelength $\lambda 2$ (600 nm$\leq\lambda 2\leq$700 nm) on an information recording surface of the second optical information recording medium having protective substrate thickness t2 (0.5 mm$\leq$t2$\leq$0.7 mm), and thereby, recording and/or recording of information for the second optical information recording medium can be conducted, and the diffractive optical element is arranged in a common optical path for the light flux with wavelength $\lambda 1$ and the light flux with wavelength $\lambda 2$ to satisfy the following expressions.

$$750 \text{ nm}\leq\lambda 1\leq 850 \text{ nm}$$

$$1.1 \text{ mm}\leq t1\leq 1.3 \text{ mm}$$

The structure described in Item 10 makes it possible to obtain an optical pickup apparatus having compatibility between CD representing the first optical information recording medium and DVD representing the second optical information recording medium.

The structure described in Item 11 is the diffractive optical element according to Item 10, wherein the optical pickup apparatus further converges a light flux with wavelength $\lambda 3$ (380 nm$\leq\lambda 3\leq$450 nm) on an information recording surface of the third optical information recording medium having protective substrate thickness t3 (0 mm$\leq$t3$\leq$0.7 mm), and thereby, recording and/or recording of information for the third optical information recording medium can be conducted, and the diffractive optical element is arranged in a common optical path for the light flux with wavelength $\lambda 1$, the light flux with wavelength $\lambda 2$ and the light flux with wavelength $\lambda 3$.

The structure described in Item 11 makes it possible to obtain an optical pickup apparatus having compatibility for CD representing the first optical information recording medium, DVD representing the second optical information recording medium and a high density optical disc representing the third optical information recording medium.

The structure described in Item 12 is the diffractive optical element according to Item 11, wherein 30%$\leq$E$\leq$60% is satisfied. In the structure described in Item 12, if E is made to be 30% or more, a sufficient amount of $m^{th}$ diffracted beam can be secured, and reproducing and/or recording of information for the first optical information recording medium can be conducted more satisfactorily. Further, when E is made to be 60% or less, there is generated a difference in diffraction angle between a light flux with wavelength λ1 and a light flux with wavelength λ3, and its difference can correct spherical aberration caused by a difference in protective substrate thickness.

The structure described in Item 13 is the diffractive optical element according to Item 11, wherein 0.5 mm≦t3≦0.7 mm is satisfied.

In the structure described in Item 13, AOD can be used as a high density disc.

The structure described in Item 14 is the diffractive optical element according to Item 13, wherein optical system magnification M of composed optical system wherein the diffractive optical element and an objective lens included in th optical pickup apparatus are combined for the $m^{th}$ order diffracted beam generated when a light flux with wavelength λ1 satisfies −1/10≦M≦0.

For using three types of optical information recording media compatibly on the same diffractive optical element, two light fluxes having respectively two different wavelengths among three different wavelengths are made to be compatible each other, and the remaining one light flux with a different wavelength is made to be compatible with others by making its incident angle for the diffractive optical element to be different from those of other two light fluxes. In the structure described in Item 14, optical system magnification M of composed optical system for the light fluxes respectively with wavelength λ2 and wavelength λ3 is substantially zero, thus, there are advantages for downsizing of the optical pickup apparatus and for excellent tracking characteristics for light fluxes respectively with wavelength λ2 and wavelength λ3 having more sensitive aberration characteristics for error primary factors, because of relatively short wavelength.

The structure described in Item 15 is the diffractive optical element according to any one of Items 1–14, wherein the diffractive optical element is an objective lens.

In the structure described in Item 15, it is possible to reduce the number of parts of the optical element constituting the optical pickup apparatus, by making the objective lens and the diffractive optical element to be common each other.

The structure described in Item 16 is the diffractive optical element according to any one of Items 1–14, wherein there is arranged to face the plane of incidence closer to the light source on the objective lens.

In the present specification, the wording "to face the plane of incidence closer to the light source on the objective lens" or "facing an incidence surface of the objective lens on the light-source side" means the state wherein other optical elements are not present between the diffractive optical element and the objective lens.

The structure described in Item 17 is the diffractive optical element according to any one of Items 1–14, wherein an objective lens included in the optical pickup apparatus comprises combined two optical elements, and the diffractive optical element is one of the aforesaid two optical elements.

The structure described in Item 18 is the diffractive optical element according to any one of Items 1–14, wherein the diffractive optical element and the objective lens included in the optical pickup apparatus are formed solidly as one body, and they are movable in the optical axial direction integrally.

The structure described in Item 19 is the diffractive optical element according to any one of Items 1–18, wherein a sectional form of the diffractive structure including an optical axis is in a serration.

The structure described in Item 20 is the diffractive optical element according to any one of Items 1–19, wherein the diffractive optical element is made of plastic.

In the structure described in Item 20, manufacturing cost of the diffractive optical element can be controlled.

The structure described in Item 21 is an optical pickup apparatus for reproducing and/or recording of information for the first optical information recording medium by converging a light flux with wavelength λ1 on an information recording surface of the first optical information recording medium using an objective lens in a converging optical system, wherein a diffractive optical element provided with a diffractive structure on an area that is at least an optical surface including an optical axis thereon, and when m represents a diffraction order number of the diffracted beam used for reproducing and/or recording of information for the first optical information recording medium among plural diffracted beams with plural diffraction order numbers generated when the light flux with the wavelength λ1 receives diffractive actions from the diffractive structure, diffraction efficiency E of the $m^{th}$ order diffracted beam satisfies the following expression (1), and distance L [mm] between the paraxial converging position of the diffracted beam having higher diffraction efficiency among $(m+1)^{th}$ order diffracted beam and $(m-1)^{th}$ order diffracted beam and the paraxial converging position of the $m^{th}$ order diffracted beam satisfies the following expression (2).

$$20\% \leq E \leq 90\% \quad (1)$$

$$0.0016 \leq L/f \leq 0.032 \quad (2)$$

In the aforesaid expressions, m represents a positive integer, f [mm] represents a focal length for a light flux with wavelength λ1 of the diffractive optical element for the $m^{th}$ order diffracted beam, and $(m-1)^{th}$ diffracted beam in the case of m=1, namely, $0^{th}$ order diffracted beam is a light flux that is not diffracted and is transmitted through the diffractive structure as it is, without being given a substantial optical path difference by the diffractive structure.

The structure described in Item 22 is the optical pickup apparatus according to Item 21, wherein 0.003≦L/f≦0.032 is satisfied.

The structure described in Item 23 is the optical pickup apparatus according to Item 21 or Item 22, wherein a position where the diffracted beam having higher diffraction efficiency intersects an optical axis disagrees with a position where the $m^{th}$ order diffracted beam intersects an optical axis.

The structure described in Item 24 is the optical pickup apparatus according to Item 23, wherein a position where the diffracted beam having higher diffraction efficiency intersects an optical axis is closer to the objective lens than a position where the $m^{th}$ order diffracted beam intersects an optical axis is.

The structure described in Item 25 is the optical pickup apparatus according to any one of Items 21–24, wherein a diffraction order number of the diffracted beam having the higher diffraction efficiency is (m−1).

Incidentally, it is preferable that the order number m mentioned above is any one of 1, 2 and 3, and m=2 is more preferable.

The structure described in Item 26 is the optical pickup apparatus according to Item 25, wherein a paraxial converging position of the (m−1)$^{th}$ order diffracted beam is closer to the image point than that of the m$^{th}$ order diffracted beam.

The structure described in Item 27 is the optical pickup apparatus according to any one of Items 21–26, wherein m=2 holds.

The structure described in Item 28 is the optical pickup apparatus according to any one of Items 21–27, wherein 1 mm≦f≦4 mm is satisfied.

The structure described in Item 29 is the optical pickup apparatus according to any one of Items 21–28, wherein ΔfB is a change amount of position along an optical axis on which a wavefront aberration is minimum corresponding to a wavelength variation with 1 nm in a converged spot formed on the information recording surface of the first optical information medium using the m-th order diffracted beam and satisfies |ΔfB|≦0.0001 mm.

The structure described in Item 30 is the optical pickup apparatus according to any one of Items 21–29, wherein the optical pickup apparatus further converges a light flux with wavelength λ2 (600 nm≦λ2≦700 nm) on an information recording surface of the second optical information recording medium having protective substrate thickness t2 (0.5 mm≦t2≦0.7 mm), and thereby, reproducing and/or recording of information for the second optical information recording medium can be conducted, and the diffractive optical element is arranged in a common optical path for the light flux with wavelength λ1 and the light flux with wavelength λ2 to satisfy the following expressions.

750 nm≦λ1≦850 nm 1.1 mm≦t1≦1.3 mm

The structure described in Item 31 is the optical pickup apparatus according to Item 30, wherein the optical pickup apparatus further converges a light flux with wavelength λ3 (380 nm≦λ3≦450 nm) on an information recording surface of the third optical information recording medium having protective substrate thickness t3 (0 mm≦t3≦0.7 mm), and thereby, recording and/or reproducing of information for the third optical information recording medium can be conducted, and the diffractive optical element is arranged in a common optical path for the light flux with wavelength λ1, the light flux with wavelength λ2 and the light flux with wavelength λ3.

Further, the structure described in Item 32 is the diffractive optical element according to Item 31, wherein 30%≦E≦60% is satisfied.

The structure described in Item 33 is the optical pickup apparatus according to Item 31, wherein 0.5 mm≦t3≦0.7 mm is satisfied.

The structure described in Item 34 is the optical pickup apparatus according to Item 33, wherein optical system magnification M of composed optical system wherein the diffractive optical element and an objective lens included in th optical pickup apparatus are combined for the m$^{th}$ order diffracted beam generated when a light flux with wavelength λ1 satisfies −1/10≦M≦0.

The structure described in Item 35 is the optical pickup apparatus according to any one of Items 21–34, wherein the diffractive optical element is an objective lens.

The structure described in Item 36 is the optical pickup apparatus according to any one of Items 21–34, wherein the diffractive optical element is arranged to face a plane of incidence of the objective lens, the plane of incidence being closer to the light source.

The structure described in Item 37 is the optical pickup apparatus according to any one of Items 21–34, wherein an objective lens included in the optical pickup apparatus comprises combined two optical elements, and the diffractive optical element is one of the aforesaid two optical elements.

The structure described in Item 38 is the optical pickup apparatus according to any one of Items 21–34, wherein the diffractive optical element and the objective lens included in the optical pickup apparatus are formed solidly as one body through a connecting member, and they are movable in the optical axial direction integrally.

The structure described in Item 39 is the optical pickup apparatus according to any one of Items 21–38, wherein a sectional form of the diffractive structure including an optical axis is in a serration.

The structure described in Item 40 is the optical pickup apparatus according to any one of Items 21–39, wherein the diffractive optical element is made of plastic. In the invention, it is possible to obtain a diffractive optical element which has chromatic aberration capable of recording and reproducing without any problem even in the case of instantaneous wavelength change in a laser beam that cannot be followed by an actuator, and can control an adverse effect caused on a spot diameter of a converged spot and on a signal read by a sensor, and to provide an optical pickup apparatus equipped with the diffractive optical element.

A preferred embodiment for practicing the invention will be explained in detail as follows, referring to the drawings.

In the present embodiment, optical pickup apparatus 10 is provided with first light source 11, second light source 12 and third light source 13 which respectively emit light fluxes which respectively have wavelength λ1 (785 nm), wavelength λ2 (655 nm) and wavelength λ3 (407 nm), as shown in FIG. 1.

The embodiment is of the structure having compatibility for three types of optical disks wherein the light fluxes mentioned above are used to conduct recording and/or reproducing of information for first optical information recording medium 31 with t1 (1.2 mm)-thick protective substrate 31a (CD in the present embodiment), second optical information recording medium 32 with t2 (0.6 mm)-thick protective substrate 32a (DVD in the present embodiment) and third optical information recording medium 33 with t3 (0.6 mm)-thick protective substrate 33a (AOD as a high density optical disc in the present embodiment).

Figure 2:
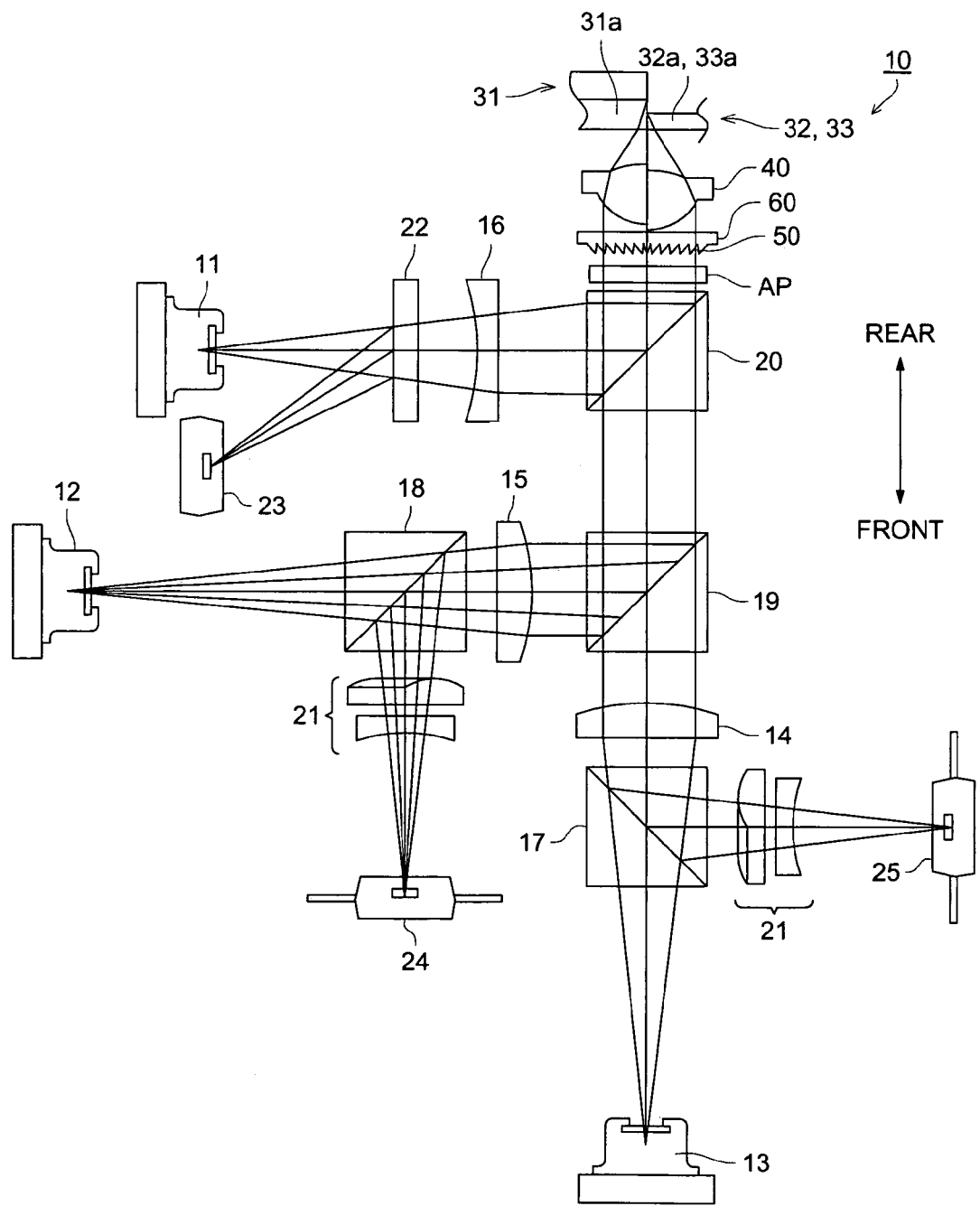
FIG. 2 is a plan view showing the structure of an optical pickup apparatus.

In FIG. 1, the same diagram is used to show both DVD protective substrate 32a and AOD protective substrate 33a which are substantially the same in terms of thickness t2 and t3 each representing a protective substrate thickness. In FIG. 2, CD, DVD and AOD are shown by the same diagram for convenience.

The optical pickup apparatus 10 is roughly composed of semiconductor laser light sources (first–third light sources) 11–13, first and second collimator lenses 14 and 15, coupling lens 16, first–fourth beam splitters 17–20, single-lens type objective lens 40 that is provided with diffractive structure 50 and is arranged to face an information recording surface of each optical disk (diffractive optical element), two-dimensional actuator that moves the objective lens 40 in the prescribed direction (not shown), sensor lens 21, diffraction plate 22, first–third photodetectors 23–25 each detecting reflected light coming from each optical disk and dichroic filter AP that regulates a diameter of a light flux with wavelength λ3.

Incidentally, though the objective lens 40 has functions as a diffractive optical element in the present embodiment, it is also possible to employ, without being limited to the foregoing, the structure wherein diffractive optical element 60 provided with diffractive structure 50 is arranged separately just in front of the plane of incidence of the objective lens 40 and the diffractive optical element and the objective lens form a converging optical system, as shown in FIG. 2. In this case, it is also possible to arrange the dichroic filter AP between the diffractive optical element 60 and the objective lens 40.

It is further possible to employ the structure wherein an objective lens is composed of two optical elements combined, and a diffractive optical element constitutes one of the two optical elements, though an illustration is omitted, or the structure wherein a flange (connecting member) extending from a peripheral portion of a diffractive optical element toward the object side is provided, and a diffractive optical element and an objective lens are formed to be solidly through the flange, and they are moved integrally in the optical axial direction by an actuator.

Though an illustration will be omitted, it is further possible to employ a hologram laser unit wherein the first photodetector 23 and the first light source 11 are constructed to solidly, the second photodetector 24 and the second light source 12 are constructed to be solidly, or the third photodetector 25 and the third light source 13 are constructed to be solidly, and a light flux with wavelength $\lambda 1$, $\lambda 2$ or $\lambda 3$ reflected on an information recording surface of CD, DVD or AOD arrives at a hologram element after traveling through the same optical path back and forth, and the light flux is changed in terms of its direction at the hologram element, to enter the photodetector. It is further possible to use a packaged light source that is made by putting two light sources out of the first–third light sources 11–13 or putting all three light sources in one casing to unite them.

In the structure of the present embodiment, a light flux with wavelength $\lambda 1$ enters objective lens 40 as a divergent light, and each of a light flux with wavelength $\lambda 2$ and a light flux with wavelength $\lambda 3$ is made to be a collimated light to enter the objective lens 40.

Incidentally, all light fluxes respectively with wavelengths $\lambda 1$–$\lambda 3$ may enter the objective lens 40 as a divergent light or a convergent light each having substantially the same optical system magnification for the objective lens 40.

Operations of the optical pickup apparatus 10 constructed in the aforesaid manner are known widely, and detailed explanation will be omitted. A light flux with wavelength $\lambda 3$ emitted from the third light source 13 passes through first beam splitter 17, and is collimated at the first collimator lens 14 to pass through the third and fourth beam splitters 19 and 20. Then, after passing through dichroic filter AP, diffractive structure 50 is formed on plane of incidence 41 of the objective lens 40, and a light flux with wavelength $\lambda 1$ undergoes refractive operations on plane of incidence 41 and plane of emergence 42 of the objective lens 40 and undergoes diffractive operations on the plane of incidence 41 to be emitted, though the detailed explanation will be given later.

A diffracted beam having prescribed order number among diffracted beams emerging from the objective lens 40 is converged on an information recording surface of AOD 31, and forms spot P on optical axis 1. Then, a light flux with wavelength $\lambda 1$ converged on the spot P is modulated by information pits on an information recording surface to be reflected. The reflected light flux passes again through objective lens 40, dichroic filter AP, fourth and third beam splitters 20 and 19 and first collimator lens 14, to be reflected on the first beam splitter 17 to be branched.

Then, the branched light flux with wavelength $\lambda 1$ enters third photodetector 25 through sensor lens 21. The third photodetector 25 detects a spot of incident light and outputs signals, and thus, the outputted signals are used to obtain signals through reading of information recorded on AOD 31.

Further, form changes of a spot on third photodetector 25 and light amount changes caused by position changes are detected to conduct focusing detection and tracking detection. Based on the results of the detections, the two-dimensional actuator moves the objective lens 40 both in the focusing direction and in the tracking direction, so that the light flux with wavelength $\lambda 3$ may form a spot accurately on an information recording surface.

A light flux with wavelength $\lambda 2$ emitted from second light source 12 passes through second beam splitter 18 and is collimated by second collimator lens 15, then, is reflected on third beam splitter 19 and passes through fourth beam splitter 20 and dichroic filter AP to arrive at the objective lens 40. Then, the light flux undergoes refractive operations on plane of incidence 41 and plane of emergence 42 of the objective lens 40 and undergoes diffractive operations on the plane of incidence 41 to be emitted.

A diffracted beam having prescribed order number among diffracted beams emerging from the objective lens 40 is converged on an information recording surface of DVD 32, and forms spot P on optical axis 1. Then, a light flux with wavelength $\lambda 2$ converged on the spot P is modulated by information pits on an information recording surface to be reflected. The reflected light flux passes again through objective lens 40, dichroic filter AP and fourth beam splitter 20, to be reflected on the third beam splitter 19 to be branched.

Then, the branched light flux with wavelength $\lambda 2$ passes through second collimator lens 15, then, is reflected on the second beam splitter 18 to be branched, and passes through sensor lens 21 to enter second photoreceptor 24. Operations thereafter are the same as those in the light flux with wavelength $\lambda 3$.

A light flux with wavelength $\lambda 1$ emitted from the first light source 11 passes through diffractive plate 22 provided in place of a beam splitter, then, is changed in terms of a divergent angle at coupling lens 16, and is reflected on fourth beam splitter 20, and is regulated in terms of a light flux diameter by dichroic filter AP to arrive at objective lens 40. Then, it is subjected to refracting actions on plane of incidence 41 and plane of emergence of the objective lens 40, and is subjected to diffractive actions on plane of incidence 41 to emerge.

A diffracted beam having prescribed order number among diffracted beams emerging from the objective lens 40 (diffraction order number m=2 in the present embodiment) is converged on an information recording surface of CD 33, and forms spot P on optical axis 1. Then, a light flux with wavelength $\lambda 1$ converged on the spot P is modulated by information pits on an information recording surface to be reflected. The reflected light flux passes again through objective lens 40 and dichroic filter AP to be reflected on the fourth beam splitter 20 to be branched.

Then, the branched light flux with wavelength $\lambda 1$ passes through third collimator lens 16 and is changed in terms of its way in the course of passing through diffraction plate 22, and enters first photodetector 23. Operations thereafter are the same as those in the light flux with wavelength $\lambda 3$.

Figure 3:
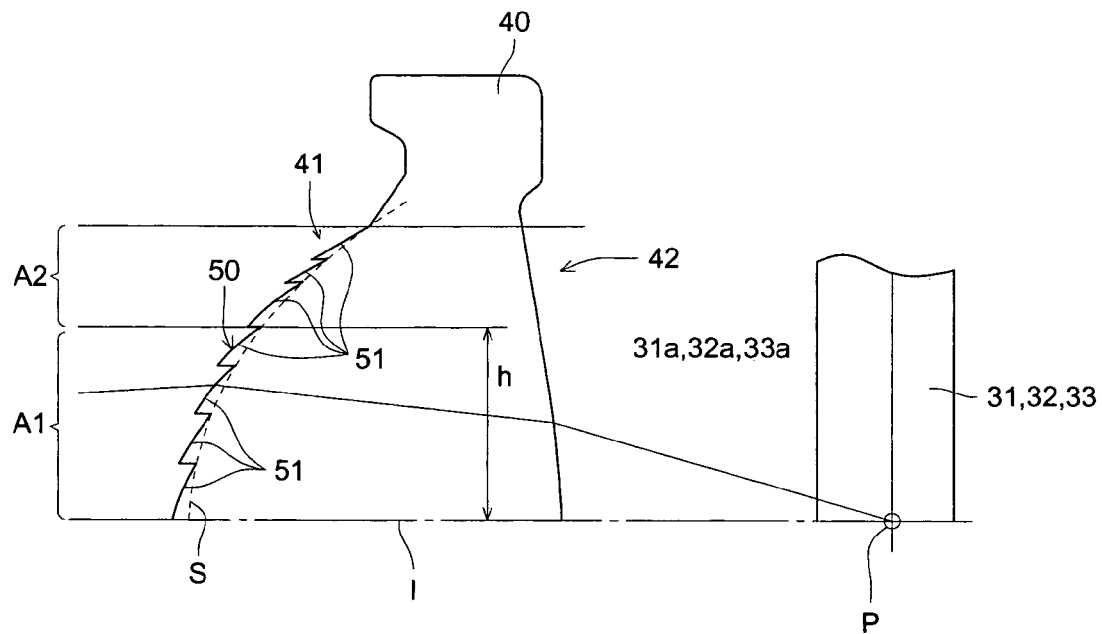
FIG. 3 is a cross-sectional view of primary portions showing the structure of an objective lens.

As is shown in FIG. 3, the objective lens 40 is a plastic single lens wherein each of plane of incidence 41 and plane of emergence 42 is an aspheric surface and is convex.

Diffractive structure 50 is formed on almost total area of plane of incidence 51, and plane of emergence 52 is made to be a refracting interface.

In the present embodiment, the plane of incidence 51 is divided into central area A1 that includes optical axis 1 and is an area where the height from the optical axis 1 is h or less and peripheral area A2 where the height from the optical axis 1 is h or more and the central area A1 is surrounded the central area A1 is an area corresponding to numerical aperture NA3 of AOD (0.65).

The diffractive structure 50 formed on the central area A1 and the peripheral area A2 is composed of plural diffractive ring-shaped zones 51 which are in the shape of concentric circles having their centers on the optical axis 1 substantially, and a light flux that passes through the diffractive ring-shaped zones 51 receives from them diffracting operations.

Incidentally, a form and a design method for the diffractive ring-shaped zones 51 are known widely, and explanation and illustration for them will be omitted here.

The light flux with wavelength $\lambda 1$ that passes through a part of the central area A1 after being regulated in terms of a light flux diameter when passing through dichroic filter AP is subjected to diffracting operations by the diffractive ring-shaped zones 51 of the central area A1, and it is used for recording and/or reproducing of information for CD, when secondary order diffracted beam among them forms a converged spot on the information recording surface of CD.

Light fluxes respectively with wavelength $\lambda 2$ and $\lambda 3$ that pass through the central area A1 are subjected to diffracting operations by the diffractive ring-shaped zones 51 of the central area A1, and are used for recording and/or reproducing of information respectively for DVD and AOD, when diffracted beam having prescribed diffraction order number among them forms a converged spot on the information recording surface respectively of DVD and AOD.

Further, the light flux with wavelength $\lambda 2$ that passes through the peripheral area A2 is subjected to diffracting operations by the diffractive ring-shaped zones 51 of the peripheral area A2, and it is used for recording and/or reproducing of information for DVD, when a diffracted beam having prescribed diffraction order number among them forms a converged spot on an information recording surface of DVD.

On the other hand, the light flux with wavelength $\lambda 3$ that passes through the peripheral area A2 is subjected to diffracting operations by the diffractive ring-shaped zones 51 of the peripheral area A2 to be flared, and it is not used for recording and/reproducing of information for AOD.

In the invention, diffraction efficiency E of the diffracted beam with diffraction order number of m ($2^{nd}$ order in the present embodiment) having the maximum diffraction efficiency among light fluxes with wavelength $\lambda 1$ which pass through the central area A1 is within a range of $20\% \leq E \leq 90\%$ (Expression 1), and distance L between a paraxial converging position of the diffracted beam having the higher diffraction efficiency among the $(m+1)^{th}$ order ($3^{rd}$ order in the present embodiment) diffracted beam and the $(m-1)^{th}$ order (the first order in the present embodiment) diffracted beam and a paraxial converging position of the $m^{th}$ order diffracted beam satisfies $0.0016 \leq L/f \leq 0.032$ (Expression 2). In the foregoing, m represents a positive integer and f represents a focal length of an objective lens for $m^{th}$ order diffracted beam of the light flux with wavelength $\lambda 1$.

By making L/f to be 0.001 or more (preferably, 0.003 or more) as stated above, it is possible to make a paraxial converging position of the diffracted beam having higher diffraction efficiency among the $(m+1)^{th}$ order diffracted beam and the $(m-1)^{th}$ order diffracted beam (for example, $(m+1)^{th}$ order diffracted beam), namely, of the diffracted beam having higher diffraction efficiency among useless diffracted beams and a paraxial converging position of the $m^{th}$ diffracted beam that is used to disagree in terms of position on the optical axis, and to be away from each other, to prevent an enlargement of a diameter of an emergence spot.

Further, a position where the useless diffracted beams having a higher diffraction efficiency intersect the optical axis is made to be different from a position where the $m^{th}$ order diffracted beam intersects the optical axis.

Hereby, it is possible to prevent an enlargement of a diameter of a converged spot, and to prevent that useless diffracted beams reflected on an information recording surface of CD enters first photodetector 23, thus, it is possible to keep linearity of RF signals for an amount of defocus, and to prevent an adverse effect on focusing characteristics of the objective lens 40.

Further, by making L/f to be 0.032 or less, $\Delta fB$, a change amount of position along an optical axis on which a wavefront aberration is minimum corresponding to a wavelength variation with 1 nm in a converged spot formed on the information recording surface of the first optical information medium using the m-th order diffracted beam, can be controlled to be in a small value, and it is possible to prevent that focus characteristics of the objective lens 40 are adversely affected in the case of mode hopping.

Incidentally, it is preferable that $\Delta fB$ is made to be within a range of $|\Delta fB| \leq 0.0001$ mm, and f is made to be within a range of 1 mm $\leq f \leq 4$ mm.

Further, by making distance L between a paraxial converging position of the useless diffracted beams having higher diffraction efficiency and a paraxial converging position of the $m^{th}$ order diffracted beam to be within a range of the Expression 2, it is possible to prevent troubles of an enlargement of a spot diameter caused by the diffracted beam having lower diffraction efficiency (for example, $(m-1)^{th}$ order diffracted beam).

When use of the $m^{th}$ order diffracted beam of the light flux with wavelength $\lambda 1$ lowers diffraction efficiency, and thereby, makes it impossible to obtain an amount of light necessary for conducting reproducing and/or recording of information for CD, it is possible to employ the structure wherein a decline of an amount of light on the CD side is made up by making an output of the first light source 11 that emits the light flux with wavelength $\lambda 1$ to be greater than that of other light sources, or by raising sensor sensitivity of the first photodetector 23, or by devising signal processing.

Figure 4:
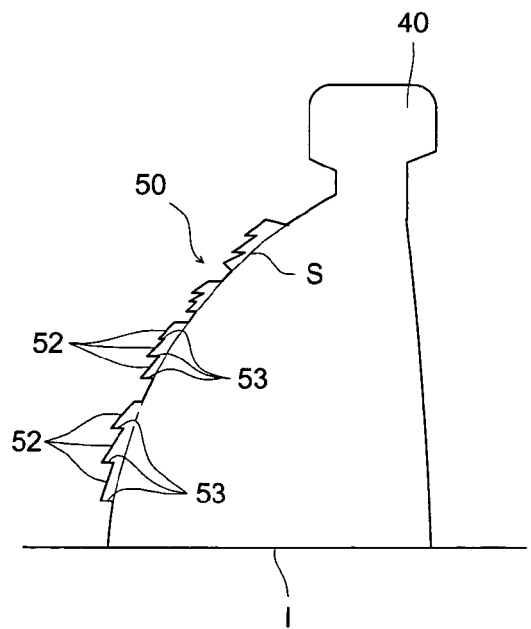
FIG. 4 is a cross-sectional view of primary portions showing the structure of an objective lens.

As diffractive structure 50, what is shown in FIG. 4, for example, may also be employed. The diffractive structure 50 shown in FIG. 4 is of the structure of plural steps wherein plural ring-shaped zones 52 whose centers are on the optical axis 1 are connected through differences in level 53 which are substantially in parallel with optical axis 1.

Each ring-shaped zone 52 is formed in a way to protrude toward the light source side (in the forward direction) as it becomes more distant from the optical axis 1, to give a prescribed optical path difference to a light flux entering each ring-shaped zone 52, and thereby to cause a phase difference on each light flux, resulting in that a phase of the light flux having passed through each ring-shaped zone 52 is lined up substantially with others on an information recording surface. Incidentally, a form of each difference in level 53 can be stipulated by a displacement in the direction of optical axis 1 for base aspheric surface S.

Further, the diffractive structure 50 may also be provided on one or both of plane of incidence 41 and plane of emergence 42 of the objective lens 40.

Further, as AOD, it is also possible to use the so-called two-layer disc that is structured by laminating a t3-thick protective substrate, a first information recording surface, an intermediate layer and a second information recording surface in the order of the direction of optical axis 1 from the light source.

In the structure of the present embodiment, optical pickup apparatus 10 has compatibility for three types of optical disks including a high density optical disc, DVD and CD, and diffraction efficiency and L/f satisfy the expressions (1) and (2) mentioned above concerning CD using a light flux with wavelength $\lambda 1$. However, without being limited to this, a structure wherein compatibility between any two types of the optical disks is provided, and diffraction efficiency and L/f satisfy the expressions (1) and (2) mentioned above, or a structure wherein the optical pickup apparatus can conduct recording and reproducing for any one type of optical disk alone and diffraction efficiency and L/f satisfy the expressions (1) and (2) mentioned above concerning the aforesaid optical disk, may also be used.

EXAMPLE

An example will be explained as follows.

In the present example, each of a plane of incidence and a plane of emergence of the objective lens is made to be in a form of an aspheric surface, and the plane of incidence is divided into a central area with h<2.015 mm and a peripheral area with h≧2.015 mm, and is provided with plural diffractive ring-shaped zones in a shape of serration whose centers are on the optical axis, as a diffractive structure.

Lens data of the objective lens are shown in Table 1 and Table 2.

TABLE 2

Aspheric surface data

| $2^{nd}$ surface (2.015 mm > h) | | | |
|---|---|---|---|
| Aspheric surface coefficient | | k | $-5.2595 \times E - 1$ |
| | | A4 | $+1.6647 \times E - 3$ |
| | | A6 | $-2.1030 \times E - 3$ |
| | | A8 | $+8.6895 \times E - 4$ |
| | | A10 | $-1.5103 \times E - 4$ |
| | | A12 | $+3.8416 \times E - 6$ |
| | | A14 | $-1.1637 \times E - 7$ |
| Optical path difference function | | C2 | $-1.2090$ |
| | | C4 | $-2.3453 \times E - 1$ |
| | | C6 | $-3.5832 \times E - 1$ |
| | | C8 | $+1.0196 \times E - 1$ |
| | | C10 | $-1.2838 \times E - 2$ |
| $2'^{th}$ surface (2.015 mm ≦ h) | | | |
| Aspheric surface coefficient | | k | $-5.7356 \times E - 1$ |
| | | A4 | $+1.3111 \times E - 3$ |
| | | A6 | $-2.4440 \times E - 3$ |
| | | A8 | $+1.0698 \times E - 3$ |
| | | A10 | $-1.9365 \times E - 4$ |
| | | A12 | $+1.7480 \times E - 5$ |
| | | A14 | $-1.6562 \times E - 6$ |
| Optical path difference function | | C2 | $-2.0666$ |
| | | C4 | $-6.2356 \times E - 1$ |
| | | C6 | $-6.9224 \times E - 1$ |
| | | C8 | $+1.8058 \times E - 1$ |
| | | C10 | $-2.0645 \times E - 2$ |
| $3^{rd}$ surface | | | |
| Aspheric surface coefficient | | k | $-3.0487 \times E + 2$ |
| | | A4 | $-9.7915 \times E - 3$ |
| | | A6 | $+1.1536 \times E - 2$ |
| | | A8 | $-5.4213 \times E - 3$ |

TABLE 1

Example 1 Lens data

AOD/DVD/CD compatible objective lens

| | | CD | | DVD | | AOD | |
|---|---|---|---|---|---|---|---|
| Focal length of objective lens | | f1: 3.12 mm | | f2: 3.20 mm | | f3: 3.1 mm | |
| Numerical aperture on image surface side | | NA1: 0.51 | | NA2: 0.65 | | NA3: 0.65 | |
| Diffraction order number on $2^{nd}$ surface | | n1: 2 | | n2: 2 | | n3: 3 | |
| Diffraction order number on $2^{nd}$ surface | | | | n'2: 1 | | | |
| Magnification | | m1: −1/42.6 | | m2: 0 | | m3: 0 | |

| $i^{th}$ surface | Ri | di (407 nm) | ni (407 nm) | di (655 nm) | ni (655 nm) | di (785 nm) | ni (785 nm) |
|---|---|---|---|---|---|---|---|
| 0 | | ∞ | | ∞ | | 135.60 | |
| 1 | ∞ | 0.1 | | 0.1 | | 0.1 | |
| (Aperture diameter) | | (φ4.03 mm) | | (φ4.16 nm) | | (φ3.25 nm) | |
| 2 | 1.96643 | 1.760000 | 1.559806 | 1.760000 | 1.540725 | 1.760000 | 1.537237 |
| 2' | 1.96709 | 0.012000 | | 0.012000 | | 0.012000 | |
| 3 | −10.81993 | 1.72 | | 1.81 | | 1.51 | |
| 4 | ∞ | 0.60 | 1.61869 | 0.60 | 1.57752 | 1.20 | 1.57063 |
| 5 | ∞ | | | | | | |

*The symbol di represents a displacement from $i^{th}$ surface to $(i + 1)^{th}$ surface.
(d2' represents a displacement up to the second surface)

TABLE 2-continued

Aspheric surface data

| | | |
|---|---|---|
| | A10 | +1.2870 × E − 3 |
| | A12 | −1.5536 × E − 4 |
| | A14 | +7.4555 × E − 6 |

As shown in Table 1, in the optical pickup apparatus of the present example, focal length f1 in the case of wavelength λ1 of 785 nm emitted from the first light source is established to be 3.12 mm, image-side numerical aperture NA1 is established to be 0.51 and imaging magnification m1 is established to be −1/42.6, focal length f2 in the case of wavelength λ2 of 655 nm emitted from the second light source is established to be 3.20 mm, image-side numerical aperture NA2 is established to be 0.65 and imaging magnification m2 is established to be 0, and focal length f3 in the case of wavelength λ3 of 407 nm emitted from the third light source is established to be 3.10 mm, image-side numerical aperture NA3 is established to be 0.65 and imaging magnification m3 is established to be 0.

Surface numbers 2 and 2' in Table 1 represent respectively central area A1 and peripheral area A2 on the plane of incidence of the objective lens, and surface number 3 represents a plane of emergence of the objective lens. Further, ri represents a radius of curvature, di represents a positions in the direction of optical axis 1 from the $i^{th}$ surface to the $(i+1)^{th}$ surface, and ni represents a refractive index of each surface.

Each of the $2^{nd}$ surface, the $2'^{th}$ surface and the $3^{rd}$ surface is formed to be an aspheric surface that is stipulated by the numerical expression in which a coefficient shown in Table 1 or Table 2 is substituted in the following expression (Numeral 1), and is rotational symmetrical around the optical axis 1.

(Numeral 1)

Expression of aspheric surface form $$X(h) = \frac{(h^2/r_i)}{1 + \sqrt{1 - (1+\kappa)(h/r_1)^2}} + \sum_{i=0}^{n} A_{2i} h^{2i}$$

In the expression above, X(h) represents an axis in the direction of optical axis 1 (traveling direction of light is given a positive sign), κ represents a conic constant and $A_{2i}$ represents an aspheric surface coefficient.

An optical path length given by diffractive ring-shaped zones to a light flux with each wavelength is stipulated by the numerical expression in which a coefficient shown in Table 2 is substituted for an optical path difference function of Numeral 2.

(Numerical 2)

Optical path difference function $$\phi(h) = \left(n \times \frac{\lambda}{\lambda_B}\right) \times \sum_{i=0}^{5} C_{2i} h^{2i}$$

n: Diffraction order number

λ: Wavelength $\lambda_B$: Blaze wavelength

In the expression above, $C_{2i}$ represents a coefficient of an optical path difference function, and blaze wavelength $\lambda_B$=1 mm holds.

As shown in Table 1, a diffracted beam having an order number of n1=2 of a light flux with wavelength λ1 subjected to diffracting operations by the diffractive structure on the second surface is used for CD, a diffracted beam having an order number of n2=2 of a light flux with wavelength λ2 subjected to diffracting operations by the diffractive structure on the second surface and a diffracted beam having an order number of n'2=1 of a light flux with wavelength λ2 subjected to diffracting operations by the diffractive structure on the $2'^{th}$ surface are used for DVD, and a diffracted beam having an order number of n3=3 of a light flux with wavelength λ3 subjected to diffracting operations by the diffractive structure on the second surface is used for AOD.

As shown in Table 3, a second-order diffracted beam of the light flux with wavelength λ1 has the maximum diffraction efficiency (46.1%), and the diffraction efficiency of the first-order (m−1) diffracted beam and that of the third-order (m+1) diffracted beam of the light flux with wavelength λ1 are respectively 35.2% and 4.7%. Therefore, the diffracted beam having higher diffraction efficiency among the first-order diffracted beam and the third-order diffracted beam is the first-order diffracted beam, and L is 0.021 mm, and L/f₁ is 0.0067 (0.021 mm/3.12 mm).

Further, |ΔfB|, a change amount of position along an optical axis on which a wavefront aberration is minimum corresponding to a wavelength variation with 1 nm in a converged spot formed on the information recording surface of CD using the second order diffracted beam is 0.00003 mm.

TABLE 3

| | Diffraction order number and characteristics on $2^{nd}$ surface on CD side | | |
|---|---|---|---|
| Diffraction order number | 1 (useless diffracted beams) | 2 (working diffracted beam) | 3 (useless diffracted beams) |
| Diffraction efficiency | 35.2% | 46.1% | 4.7% |
| Paraxial focus position L *1 | 0.021 mm | 0 | −0.020mm |

Figure 5:
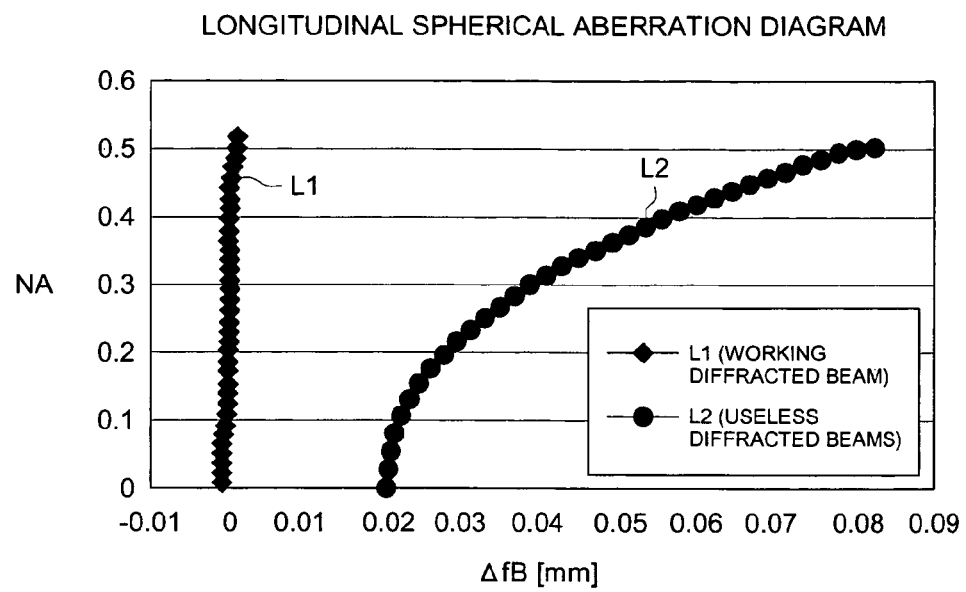
FIG. 5 is a graph showing an amount of longitudinal spherical aberration for a working diffracted beam and useless diffracted beams.

*1 Distance in the optical axial direction for paraxial converging position of light with working order number FIG. 5 is a longitudinal spherical aberration diagram for the second-order diffracted beam (working diffracted beam) used for CD and for the first-order diffracted beam representing useless diffracted beams.

FIG. 5 shows that a position where the first-order diffracted beam intersects the optical axis is different in terms of position from a position where the second-order diffracted beam intersects the optical axis.

What is claimed is:

1. A diffractive optical element for use in an optical pickup apparatus reproducing and/or recording information including a first light source for emitting a first light flux with a wavelength λ1; and a converging optical system having an objective lens for converging the first light flux on an information recording surface of a first optical information recording medium having a protective substrate with a thickness t1, the diffractive optical element comprising:
a diffractive structure formed on at least one optical surface and on an area including a optical axis on the diffractive optical element,
wherein the diffractive optical element satisfies following expressions:

$$20\% \leq E \leq 90\% \quad (1)$$

$$0.0016 \leq L/f \leq 0.032 \quad (2)$$

where E is a diffraction efficiency of a m-th order diffracted beam, m is a positive integer and a diffraction order of a diffracted beam used for information reproducing and/or recording on the first optical information medium among a plurality of diffracted beams with different diffraction orders generated when the first light flux is received a diffractive action by the diffractive structure, L [mm] is a distance between a paraxial converging position of a diffracted beam with higher diffraction efficiency among a (m+1)th order diffracted beam and a (m−1)th order diffracted beam and a paraxial converging position of a m-th order diffracted beam, f [mm] is a focal length of the diffractive optical element for the first light flux, and a $0^{th}$ order diffracted beam which is a (m−1)th order diffracted beam when m is 1, is a light flux passing through the diffractive structure without being diffracted because the diffractive structure doesn't provide an substantial optical path difference to the passing light flux.

2. The diffractive optical element of claim 1, wherein the diffractive optical element satisfies $0.003 \leq L/f \leq 0.032$.

3. The diffractive optical element of claim 1, wherein an intersection of the diffracted beam with the higher diffraction efficiency and an optical axis is different from an intersection of the m-th order diffracted beam and the optical axis.

4. The diffractive optical element of claim 3, wherein the intersection of the diffracted beam with the higher diffraction efficiency and the optical axis is closer to the objective lens than an intersection of the m-th order diffracted beam and the optical axis.

5. The diffractive optical element of claim 1, wherein the diffracted beam with the higher diffraction efficiency has a (m−1)th diffraction order.

6. The diffractive optical element of claim 5, a paraxial converging position of the (m−1)th order diffracted beam is closer to an image side than the paraxial converging position of the m-th order diffracted beam.

7. The diffractive optical element of claim 1, wherein the diffraction order m is 2.

8. The diffractive optical element of claim 1, wherein the diffractive optical element satisfies $1 \text{ mm} \leq f \leq 4 \text{ mm}$.

9. The diffractive optical element of claim 1, wherein the diffractive optical element satisfies a following expression:

$$|\Delta fB| \leq 0.0001 \text{ mm}$$

where $\Delta fB$ is a change amount of a position along an optical axis on which a wavefront aberration is minimum corresponding to a wavelength variation with 1 nm in a converged spot formed on the information recording surface of the first optical information medium using the m-th order diffracted beam.

10. The diffractive optical element of claim 1, wherein the optical pickup apparatus further comprises a second light source for emitting a second light flux with a wavelength $\lambda 2$ (600 nm $\leq \lambda 2 \leq$ 700 nm) which is converged on an information recording surface of a second optical information recording medium with a protective substrate with a thickness t2 (0.5 mm $\leq$ t2 $\leq$ 0.7 mm) for recording and/or reproducing information on the second optical information recording medium, the diffractive optical element is arranged into a common optical path of the first light flux and the second light flux, and satisfies following expressions:

$$750 \text{ nm} \leq \lambda 1 \leq 850 \text{ nm}$$

$$1.1 \text{ mm} \leq t1 \leq 1.3 \text{ mm}.$$

11. The diffractive optical element of claim 10, wherein the optical pickup apparatus further comprises a third light source for emitting a third light flux with a wavelength $\lambda 3$ (380 nm $\leq \lambda 3 \leq$ 450 nm) which is converged on an information recording surface of a third optical information recording medium with a protective substrate with a thickness t3 (0 mm $\leq$ t3 $\leq$ 0.7 mm) for recording and/or reproducing information on the third optical information recording medium, the diffractive optical element is arranged into a common optical path of the first light flux, the second light flux and the third light flux.

12. The diffractive optical element of claim 11, wherein the diffractive optical element satisfies $30\% \leq E \leq 90\%$.

13. The diffractive optical element of claim 11, wherein the diffractive optical element satisfies $0.5 \text{ mm} \leq t \leq 0.7 \text{ mm}$.

14. The diffractive optical element of claim 13, wherein the diffractive optical element satisfies a following expression:

$$-1/10 \leq M \leq 0$$

where M is a magnification of an optical system which comprises the diffractive optical element and the objective lens, for the m-th order diffracted beam generated when the first light flux enters into the optical system.

15. The diffractive optical element of claim 1, wherein the diffractive optical element is the objective lens of the optical pickup apparatus.

16. The diffractive optical element of claim 1, wherein the diffractive optical element is arranged in the optical pickup apparatus facing an incidence surface of the objective lens on a light-source side of the optical pickup apparatus.

17. The diffractive optical element of claim 1, wherein the objective lens in the optical pickup apparatus comprises two optical lenses and the diffractive optical element is one of two optical lenses.

18. The diffractive optical element of claim 1, wherein the diffractive optical element and the objective lens in the optical pickup apparatus are formed to be integrated in one body through a connecting member and are movable along a optical axis with being integrated in one body.

19. The diffractive optical element of claim 1, wherein a cross sectional form of the diffractive structure including an optical axis has a serrated shape.

20. The diffractive optical element of claim 1,
wherein the diffractive optical element comprises a plastic material.

21. An optical pickup apparatus for reproducing and/or recording information, comprising:
  a first light source for emitting a first light flux with a wavelength λ1; and
  a converging optical system having
    an objective lens for converging the first light flux on an information recording surface of a first optical information recording medium having a protective substrate with a thickness t1 and
    a diffractive optical element having a diffractive structure formed on at least one optical surface and on an area including a optical axis on the diffractive optical element,
  wherein the optical pickup apparatus satisfies following expressions:

$$20\% \leq E \leq 90\% \quad (1)$$

$$0.0016 \leq L/f \leq 0.032 \quad (2)$$

where E is a diffraction efficiency of a m-th order diffracted beam,
  m is a positive integer and a diffraction order of a diffracted beam used for information reproducing and/or recording on the first optical information medium among a plurality of diffracted beams with different diffraction orders generated when the first light flux is received a diffractive action by the diffractive structure,
  L [mm] is a distance between a paraxial converging position of a diffracted beam with higher diffraction efficiency among a (m+1)th order diffracted beam and a (m−1)th order diffracted beam and a paraxial converging position of a m-th order diffracted beam,
  f [mm] is a focal length of the diffractive optical element for the first light flux, and
  a $0^{th}$ order diffracted beam which is a (m−1)th order diffracted beam when m is 1, is a light flux passing through the diffractive structure without being diffracted because the diffractive structure doesn't provide an substantial optical path difference to the passing light flux.

22. The optical pickup apparatus of claim 21,
wherein the optical pickup apparatus satisfies $0.003 \leq L/f \leq 0.032$.

23. The diffractive optical element of claim 21,
wherein an intersection of the diffracted beam with the higher diffraction efficiency and an optical axis is different from an intersection of the m-th order diffracted beam and the optical axis.

24. The optical pickup apparatus of claim 23,
wherein the intersection of the diffracted beam with the higher diffraction efficiency and the optical axis is closer to the objective lens than an intersection of the m-th order diffracted beam and the optical axis.

25. The optical pickup apparatus of claim 21,
wherein the diffracted beam with the higher diffraction efficiency has a (m−1)th diffraction order.

26. The optical pickup apparatus of claim 25,
a paraxial converging position of the (m−1)th order diffracted beam is closer to an image side than the paraxial converging position of the m-th order diffracted beam.

27. The optical pickup apparatus of claim 21,
wherein the diffraction order m is 2.

28. The optical pickup apparatus of claim 21,
wherein the optical pickup apparatus satisfies $1 \text{ mm} \leq f \leq 4 \text{ mm}$.

29. The optical pickup apparatus of claim 21,
wherein the optical pickup apparatus satisfies a following expression:

$$|\Delta fB| \leq 0.0001 \text{ mm}$$

where ΔfB is a change amount of position along an optical axis on which a wavefront aberration is minimum corresponding to a wavelength variation with 1 nm in a converged spot formed on the information recording surface of the first optical information medium using the m-th order diffracted beam.

30. The optical pickup apparatus of claim 21,
wherein the optical pickup apparatus further comprises a second light source for emitting a second light flux with a wavelength λ2 (600 nm ≤ λ2 ≤ 700 nm) which is converged on an information recording surface of a second optical information on recording medium with a protective substrate with a thickness t2 (0.5 mm ≤ t2 ≤ 0.7 mm) for recording and/or reproducing information the second optical information recording medium,
the diffractive optical element is arranged into a common optical path of the first light flux and the second light flux, and satisfies following expressions:

$$750 \text{ nm} \leq \lambda1 \leq 850 \text{ nm}$$

$$1.1 \text{ mm} \leq t1 \leq 1.3 \text{ mm}.$$

31. The optical pickup apparatus of claim 30,
wherein the optical pickup apparatus further comprises a third light source for emitting a third light flux with a wavelength λ3 (380 nm ≤ λ2 ≤ 450 nm) which is converged on an information recording surface of a third optical information recording medium with a protective substrate with a thickness t3 (0 mm < t3 ≤ 0.7 mm) for recording and/or reproducing information on the third optical information recording medium,
the diffractive optical element is arranged into a common optical path of the first light flux, the second light flux and the third light flux.

32. The optical pickup apparatus of claim 31,
the optical pickup apparatus satisfies $30\% \leq E \leq 90\%$.

33. The optical pickup apparatus of claim 31,
the optical pickup apparatus satisfies $0.5 \text{ mm} \leq t \leq 0.7 \text{ mm}$.

34. The optical pickup apparatus of claim 33,
wherein the optical pickup apparatus satisfies a following expression:

$$-1/10 \leq M \leq 0$$

where M is a magnification of an optical system which comprises the diffractive optical element and the objective lens, for the m-th order diffracted beam generated when the first light flux enters into the optical system.

35. The optical pickup apparatus of claim 21,
wherein the diffractive optical element is the objective lens.

36. The optical pickup apparatus of claim 21,
wherein the diffractive optical element is arranged in the optical pickup apparatus facing an incidence surface of the objective lens on a light-source side of the optical pickup apparatus.

37. The optical pickup apparatus of claim 21,
wherein the objective lens comprises two optical lenses and the diffractive optical element is one of two optical lenses.

38. The optical pickup apparatus of claim 21,
wherein the diffractive optical element and the objective lens are formed to be integrated in one body through a connecting member and are movable along a optical axis with being integrated in one body.

39. The optical pickup apparatus of claim 21,
wherein a cross sectional form of the diffractive structure including an optical axis has a serrated shape.

40. The optical pickup apparatus of claim 21,
wherein the diffractive optical element comprises a plastic material.

* * * * *